United States Patent
Huang et al.

(10) Patent No.: US 9,014,114 B2
(45) Date of Patent: Apr. 21, 2015

(54) USER EQUIPMENT REFERENCE SIGNAL-BASED TIMING ESTIMATION

(71) Applicant: QUALCOMM Incorporated, San Diego, CA (US)

(72) Inventors: Yi Huang, San Diego, CA (US); Tao Luo, San Diego, CA (US); Taesang Yoo, San Diego, CA (US); Xiliang Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 190 days.

(21) Appl. No.: 13/678,332

(22) Filed: Nov. 15, 2012

(65) Prior Publication Data

US 2013/0156013 A1 Jun. 20, 2013

Related U.S. Application Data

(60) Provisional application No. 61/570,661, filed on Dec. 14, 2011.

(51) Int. Cl.
*H04W 4/00* (2009.01)
*H04L 12/66* (2006.01)
*H04W 72/00* (2009.01)
(Continued)

(52) U.S. Cl.
CPC ............ *H04W 72/04* (2013.01); *H04L 27/2662* (2013.01); *H04L 27/2675* (2013.01); *H04L 5/0035* (2013.01); *H04L 27/2672* (2013.01);
(Continued)

(58) Field of Classification Search
None
See application file for complete search history.

(56) References Cited

U.S. PATENT DOCUMENTS 8,248,997 B2    8/2012   Charbit et al.
8,442,151 B2 *   5/2013   Lee et al. .................. 375/299
(Continued)

FOREIGN PATENT DOCUMENTS

EP          2200245 A1    6/2010
WO    2005074305 WO    8/2005

OTHER PUBLICATIONS

CATT: Aspects of Joint Processing for Downlink CoMP, 3GPP Draft; R1-090942, 3rd Generation Partnership Project (3GPP), Mobile Competence Centre; 650, Route Des Lucioles; F-06921 Sophia-Antipolis Cedex, France, no. Athens, Greece; Feb. 4, 2009, XP050318782, [retrieved on Feb. 4, 2009], Section 2.1-2.2.
(Continued)

*Primary Examiner* — Kwang B Yao
*Assistant Examiner* — Adam Duda
(74) *Attorney, Agent, or Firm* — Norton Rose Fulbright US LLP

(57) ABSTRACT

Estimation of timing errors is disclosed that uses user equipment reference signals (UERSs). A UE models each channel in a user equipment reference signal (UERS) as a channel on an adjacent UERS tone multiplied by a phase ramping term. This phase ramping term is determined using an estimator on the modeled channels. The UE then determines the equivalent timing error by mapping the phase ramping terms into the estimated timing errors in the time domain. In coordinated multipoint (CoMP) systems, the UERS-based timing error may be used to identify an aligned common reference signal (CRS) associated with the network entity transmitting the data. With this determination, the UE may estimate a CRS-based timing error and either substitute the CRS-based timing error for the UERS-based timing error or calculate a further average timing error based on both the CRS-based and UERS-based timing errors.

28 Claims, 9 Drawing Sheets

(51) Int. Cl.
*H04W 72/04* (2009.01)
*H04L 27/26* (2006.01)
*H04L 5/00* (2006.01)

(52) U.S. Cl.
CPC .......... *H04L 27/2655* (2013.01); *H04L 5/0048* (2013.01); *H04L 5/0073* (2013.01)

(56) References Cited

U.S. PATENT DOCUMENTS

| | | | |
|---|---|---|---|
| 8,665,811 B2* | 3/2014 | Nory et al. | 370/329 |
| 8,743,824 B2* | 6/2014 | Ko et al. | 370/330 |
| 2011/0141987 A1* | 6/2011 | Nam et al. | 370/329 |
| 2011/0244877 A1* | 10/2011 | Farajidana et al. | 455/452.2 |
| 2011/0274097 A1 | 11/2011 | Zhang et al. | |
| 2012/0076040 A1 | 3/2012 | Hoshino et al. | |
| 2012/0076106 A1* | 3/2012 | Bhattad et al. | 370/330 |
| 2012/0106374 A1 | 5/2012 | Gaal et al. | |
| 2012/0207043 A1 | 8/2012 | Geirhofer et al. | |
| 2013/0044692 A1* | 2/2013 | Nory et al. | 370/329 |

OTHER PUBLICATIONS

International Search Report and Written Opinion—PCT/US2012/065577—ISA/EPO—Jan. 25, 2013.

\* cited by examiner

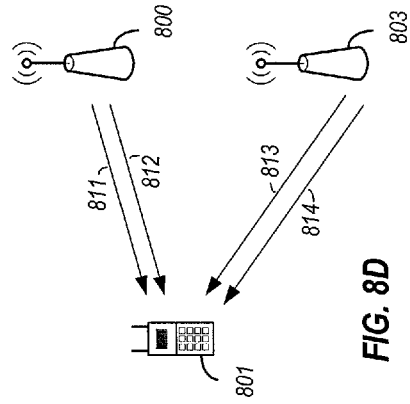
FIG. 8B
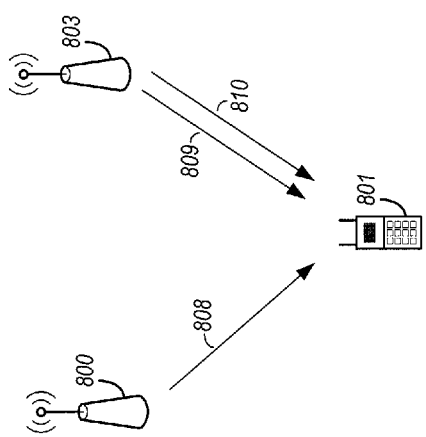
FIG. 8D
FIG. 8A
FIG. 8C

USER EQUIPMENT REFERENCE SIGNAL-BASED TIMING ESTIMATION

CROSS-REFERENCE TO RELATED APPLICATIONS

This application claims the benefit of U.S. Provisional Patent Application No. 61/570,661, entitled, "USER EQUIPMENT REFERENCE SIGNAL-BASED TIMING ESTIMATION", filed on Dec. 14, 2011, which is expressly incorporated by reference herein in its entirety.

BACKGROUND

1. Field

Aspects of the present disclosure relate generally to wireless communication systems, and more particularly, to user equipment reference signal (UERS)-based timing estimation.

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

Various aspects of the present disclosure are directed to estimation of timing errors using user equipment reference signals (UERSs). As downlink data channels are received by a UE, the received signals, including UERS signals in each of the UERS-based resource blocks (RBs) are despread. A frequency domain model is applied to each of the despread UERS signals, such that a channel in a UERS may be modeled as a channel on an adjacent UERS tone multiplied by a phase ramping term. This phase ramping term may be determined using an estimator on the modeled channels. Because the phase ramping term in the frequency domain is equivalent to the timing error in the time domain, the UE maps the estimated phase ramping terms into the time domain to derive the estimated timing errors. The UE may then use the estimated timing errors in demodulation.

In coordinated multipoint (CoMP) systems, in which the UE may receive decoupled data and control transmissions, the UERS-based timing error may be used to determine an aligned common reference signal (CRS) associated with the network entity transmitting the data. With this determination, the UE may estimate a CRS-based timing error and substitute the CRS-based timing error for the UERS-based timing error. Alternatively, the UE may combine the UERS-based and CRS-based timing errors to improve the timing estimation accuracy. For example, the UE may substitute a weighted average timing error that is based on both the UERS-based error and the CRS-based error.

In one aspect of the disclosure, a method of wireless communication that includes receiving UERS, receiving at least one CRS, estimating at least one CRS timing estimation based on each of the CRS, respectively, estimating a UERS timing estimation based, at least in part, on the UERS, determining a timing differential between the UERS timing estimation and each of the CRS timing estimations, identifying, based on the timing differential, an aligned CRS timing estimation associated with one of the CRS timing estimations, and demodulating data carried in the downlink data channel based on an a substitute timing estimate. The substitute timing estimate may be either the aligned CRS timing estimation or an average timing error estimate, wherein the average timing error estimate is based on a combination of the aligned CRS timing estimation and the UERS timing estimation.

In an additional aspect of the disclosure, an apparatus configured for wireless communication includes means for receiving UERS, means for receiving at least one CRS, means for estimating at least one CRS timing estimation based on each of the CRS, respectively, means for estimating a UERS timing estimation based, at least in part, on the UERS, means for determining a timing differential between the UERS timing estimation and each of the CRS timing estimations, means for identifying, based on the timing differential, an aligned CRS timing estimation associated with one of the CRS timing estimations, and means for demodulating data carried in the downlink data channel based on an a substitute timing estimate. The substitute timing estimate may either be the aligned CRS timing estimation or an average timing error estimate, wherein the average timing error estimate is based on a combination of the aligned CRS timing estimation and the UERS timing estimation.

In an additional aspect of the disclosure, a computer program product has a computer-readable medium having program code recorded thereon. This program code includes code to receive UERS, code to receive at least one CRS, code to estimate at least one CRS timing estimation based on each of the CRS, respectively, code to estimate a UERS timing estimation based, at least in part, on the UERS, code to determine a timing differential between the UERS timing estimation and each of the at least one CRS timing estimations, code to identify, based on the timing differential, an aligned CRS timing estimation associated with one of the at least one CRS timing estimations, and code to demodulate data carried in the downlink data channel based on an a substitute timing estimate. The substitute timing estimate may be either the aligned CRS timing estimation or an average timing error estimate, wherein the average timing error estimate is based on a combination of the aligned CRS timing estimation and the UERS timing estimation.

In an additional aspect of the disclosure, an apparatus includes at least one processor and a memory coupled to the processor. The processor is configured to receive UERS, to receive at least one CRS, to estimate at least one CRS timing estimation based on each of the CRS, respectively, to estimate a UERS timing estimation based, at least in part, on the UERS, to determine a timing differential between the UERS timing estimation and each of the CRS timing estimations, to identify, based on the timing differential, an aligned CRS timing estimation associated with one of CRS timing estimations, and to demodulate data carried in the downlink data channel based on an a substitute timing estimate. The substitute timing estimate may be either the aligned CRS timing estimation or an average timing error estimate, wherein the average timing error estimate is based on a combination of the aligned CRS timing estimation and the UERS timing estimation.

BRIEF DESCRIPTION OF THE DRAWINGS

FIGS. 8A-8D are block diagrams illustrating a UE configured according to one aspect of the present disclosure.

DETAILED DESCRIPTION

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
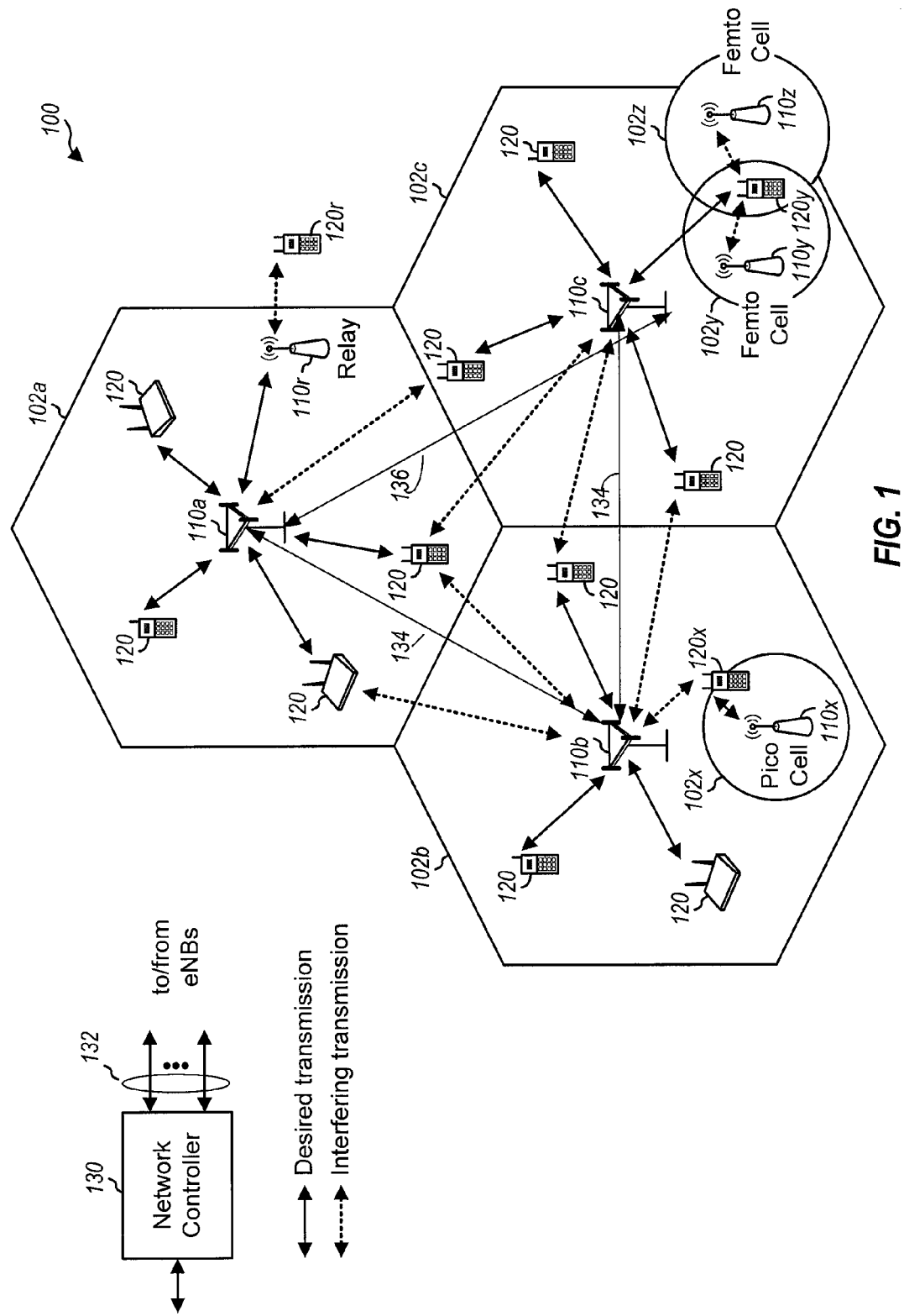
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like) cells.

The wireless network 100 also includes relay stations. A relay station is a station that receives a transmission of data and/or other information from an upstream station (e.g., an eNB, a UE, or the like) and sends a transmission of the data and/or other information to a downstream station (e.g., another UE, another eNB, or the like). A relay station may also be a UE that relays transmissions for other UEs. In the example shown in FIG. 1, a relay station 110r may communicate with the eNB 110a and a UE 120r, in which the relay station 110r acts as a relay between the two network elements (the eNB 110a and the UE 120r) in order to facilitate communication between them. A relay station may also be referred to as a relay eNB, a relay, and the like.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

Figure 2:
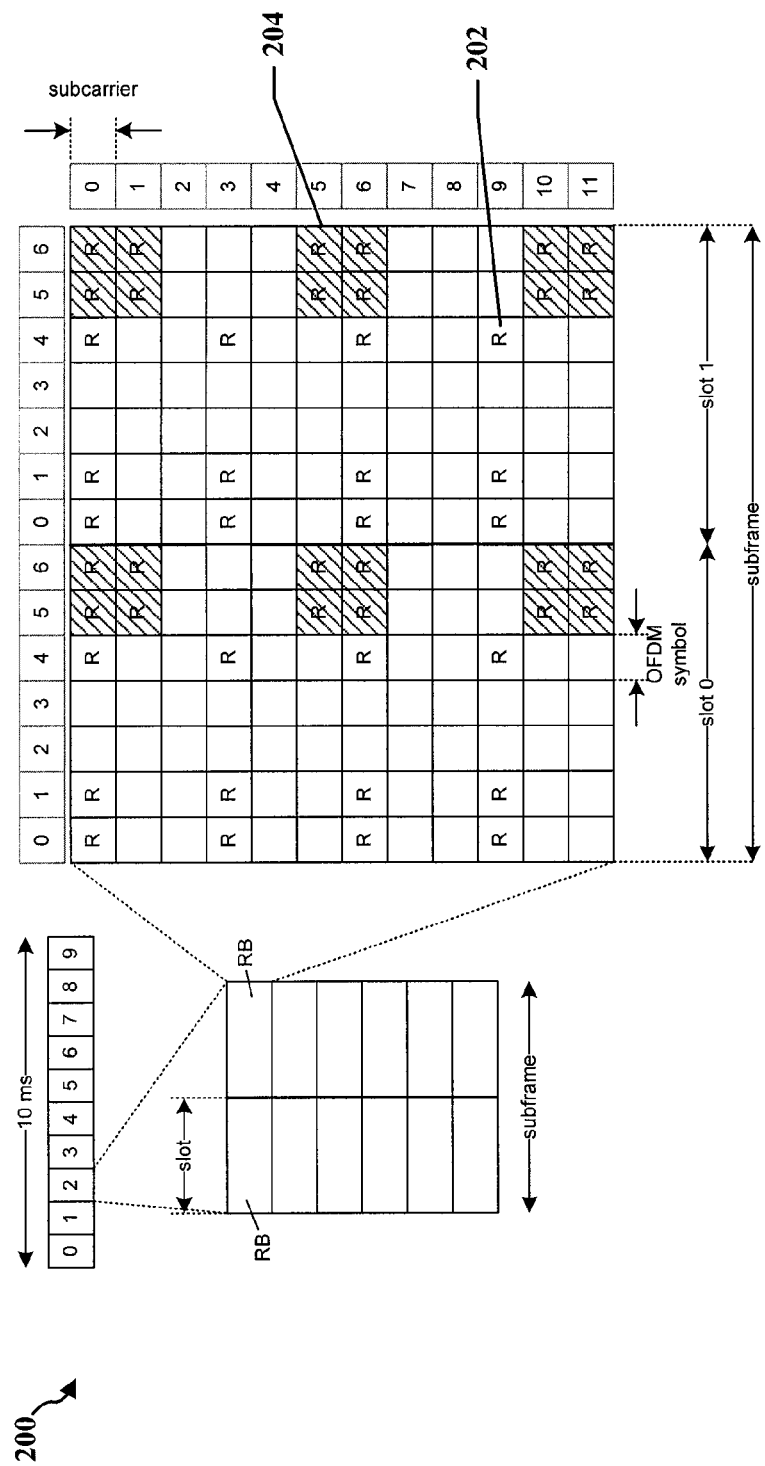
FIG. 2 is diagram illustrating an example of a downlink frame structure in LTE.

FIG. 2 is a diagram 200 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 202, 204, include DL reference signals (DL-RS). The DL-RS include Cell-specific RS (CRS) (also sometimes called common RS) 202 and UE-specific RS (UERS) 204. In LTE, only certain transmission modes (e.g., 7, 8, and 9) include provision for UERS. When UEs are in these transmission, UERS may appear in some of the allocated PDSCH RBs. UEs can generally only utilize those allocated RBs which have UERS to estimate timeing. UERS 204 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
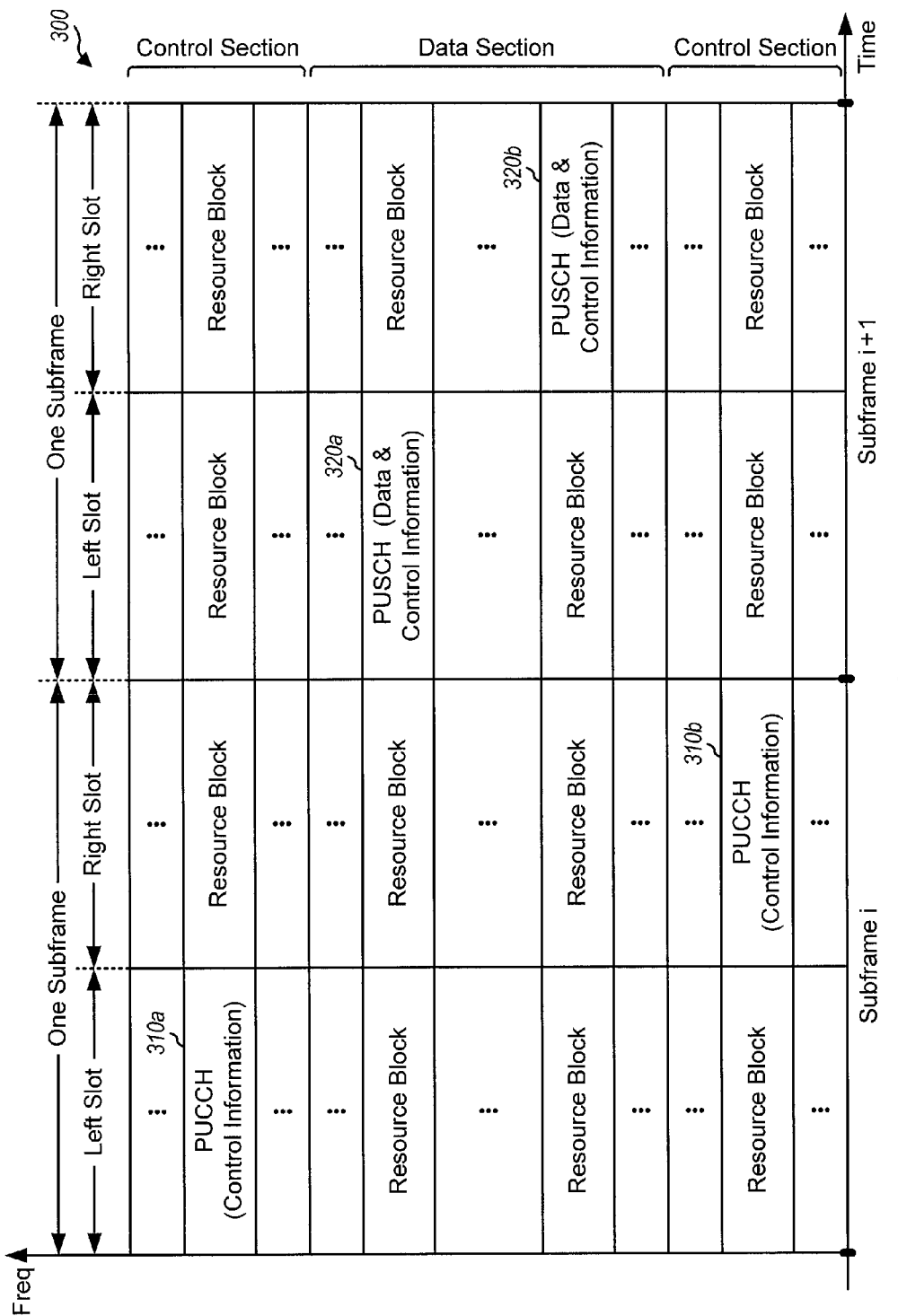
FIG. 3 is a block diagram conceptually illustrating an exemplary frame structure in uplink LTE/-A communications.

FIG. 3 is a block diagram illustrating an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310a and 310b in the control section. The UE may transmit only data or both data and control information in a Physical Uplink Shared Channel (PUSCH) on the assigned resource blocks 320a and 320b in the data section. An uplink transmission may span both slots of a subframe and may hop across frequency as shown in FIG. 3.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110a-c are usually carefully planned and placed by the provider of the wireless network 100. The macro eNBs 110a-c generally transmit at high power levels (e.g., 5 W-40 W). The pico eNB 110x and the relay station 110r, which generally transmit at substantially lower power levels (e.g., 100 mW-2 W), may be deployed in a relatively unplanned manner to eliminate coverage holes in the coverage area provided by the macro eNBs 110a-c and improve capacity in the hot spots. The femto eNBs 110y-z, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110y-z typically also transmit at substantially lower power levels (e.g., 100 mW-2 W) than the macro eNBs 110a-c.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110x, is characterized by a substantially lower transmit power when compared with a macro eNB, such as the macro eNBs 110a-c. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110a-c and the pico eNB 110x implies that, in a mixed deployment, the downlink coverage area of the pico eNB 110x will be much smaller than that of the macro eNBs 110a-c.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110a-c, limits the benefits of splitting the cell coverage with the pico eNBs, such as the pico eNB 110x, because, the higher downlink received signal strength of the macro eNBs 110a-c will attract all of the available UEs, while the pico eNB 110x may not be serving any UE because of its much weaker downlink transmission power. Moreover, the macro eNBs 110a-c will likely not have sufficient resources to efficiently serve those UEs. Therefore, the wireless network 100 will attempt to actively balance the load between the macro eNBs 110a-c and the pico eNB 110x by expanding the coverage area of the pico eNB 110x. This concept is referred to as cell range extension (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110a-c and the pico eNB 110x. However, even with this active balancing of load, downlink interference from the macro eNBs 110a-c should be mitigated for the UEs served by the pico eNBs, such as the pico eNB 110x. This can be accomplished by various methods, including interference cancellation at the UE, resource coordination among the eNBs 110, or the like.

In a heterogeneous network with cell range extension, such as the wireless network 100, in order for UEs to obtain service from the lower-powered eNBs, such as the pico eNB 110x, in the presence of the stronger downlink signals transmitted from the higher-powered eNBs, such as the macro eNBs 110a-c, the pico eNB 110x engages in control channel and data channel interference coordination with the dominant interfering ones of the macro eNBs 110a-c. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between three classes of subframes: protected subframes (U subframes), prohibited subframes (N subframes), and common subframes (C subframes). Protected subframes are assigned to a first eNB for use exclusively by the first eNB. Protected subframes may also be referred to as "clean" subframes based on the lack of interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB is the only eNB transmitting data during the first eNB's protected subframe. Common subframes may be used for data transmission by multiple eNBs. Common subframes may also be referred to as "unclean" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 4:
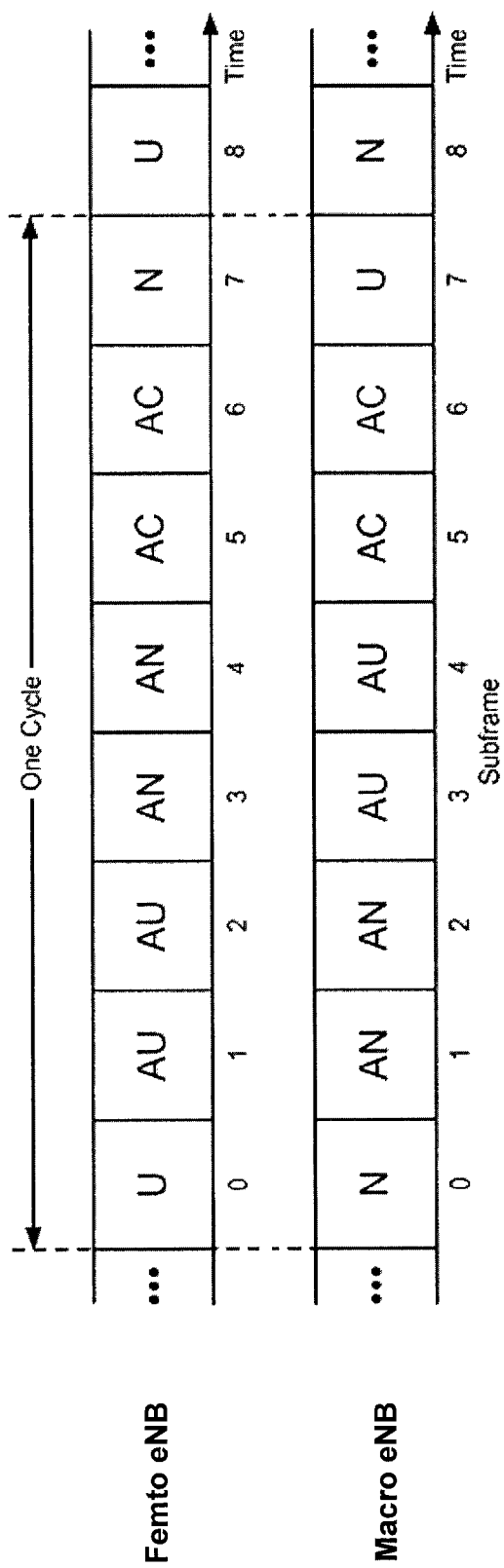
FIG. 4 is a block diagram conceptually illustrating time division multiplexed (TDM) partitioning in a heterogeneous network according to one aspect of the disclosure.

FIG. 4 is a block diagram illustrating time division multiplexed (TDM) partitioning in a heterogeneous network according to one aspect of the disclosure. A first row of blocks illustrate subframe assignments for a femto eNB, and a second row of blocks illustrate subframe assignments for a macro eNB. Each of the eNBs has a static protected subframe during which the other eNB has a static prohibited subframe. For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Common subframes (such as C/AC subframes) have a channel quality dependent on the number of neighbor eNBs transmitting data. For example, if neighbor eNBs are transmitting data on the common subframes, the channel quality of the common subframes may be lower than the protected subframes. Channel quality on common subframes may also be lower for cell range expansion (CRE) area UEs strongly affected by aggressor eNBs. A CRE UE may belong to a first eNB but also be located in the coverage area of a second eNB. For example, a UE communicating with a macro eNB that is near the range limit of a femto eNB coverage is a CRE UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c (as shown in FIG. 1) or to the femto eNB 110z also with lower received power (not shown in FIG. 1). The UE 120y may then observe high interference from the femto eNB 110y on the downlink and may also cause high interference to the eNB 110y on the uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 µs (5 km÷3×10$^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation 1of the combined signals, the actual signal portion may be determined and distinguished from the interference, thus, allowing the interference to be canceled.

Figure 5:
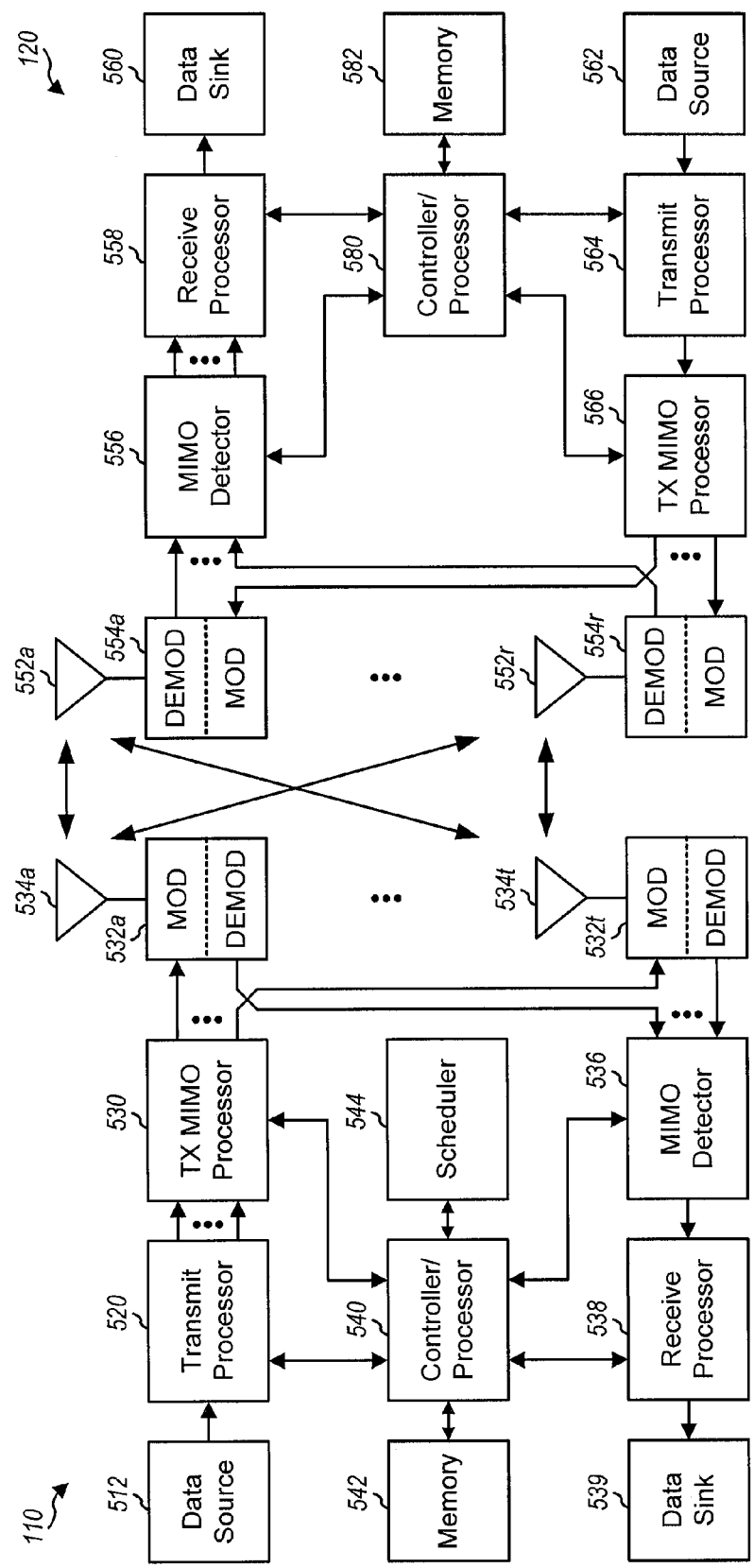
FIG. 5 is a block diagram conceptually illustrating a design of a base station/eNB and a UE configured according to one aspect of the present disclosure.

FIG. 5 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 534a through 534t, and the UE 120 may be equipped with antennas 552a through 552r.

At the eNB 110, a transmit processor 520 may receive data from a data source 512 and control information from a controller/processor 540. The control information may be for the PBCH, PCFICH, PHICH, PDCCH, etc. The data may be for the PDSCH, etc. The transmit processor 520 may process (e.g., encode and symbol map) the data and control information to obtain data symbols and control symbols, respectively. The transmit processor 520 may also generate reference symbols, e.g., for the PSS, SSS, and cell-specific reference signal. A transmit (TX) multiple-input multiple-output (MIMO) processor 530 may perform spatial processing (e.g., precoding) on the data symbols, the control symbols, and/or the reference symbols, if applicable, and may provide output symbol streams to the modulators (MODs) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via the antennas 534a through 534t, respectively.

At the UE 120, the antennas 552a through 552r may receive the downlink signals from the eNB 110 and may provide received signals to the demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554a through 554r, perform MIMO detection on the received symbols if applicable, and provide detected symbols. A receive processor 558 may process (e.g., demodulate, deinterleave, and decode) the detected symbols, provide decoded data for the UE 120 to a data sink 560, and provide decoded control information to a controller/processor 580.

On the uplink, at the UE 120, a transmit processor 564 may receive and process data (e.g., for the PUSCH) from a data source 562 and control information (e.g., for the PUCCH) from the controller/processor 580. The transmit processor 564 may also generate reference symbols for a reference signal. The symbols from the transmit processor 564 may be precoded by a TX MIMO processor 566 if applicable, further processed by the demodulators 554a through 554r (e.g., for SC-FDM, etc.), and transmitted to the eNB 110. At the eNB 110, the uplink signals from the UE 120 may be received by the antennas 534, processed by the modulators 532, detected by a MIMO detector 536 if applicable, and further processed by a receive processor 538 to obtain decoded data and control information sent by the UE 120. The processor 538 may provide the decoded data to a data sink 539 and the decoded control information to the controller/processor 540.

The controllers/processors 540 and 580 may direct the operation at the eNB 110 and the UE 120, respectively. The controller/processor 540 and/or other processors and modules at the eNB 110 may perform or direct the execution of various processes for the techniques described herein. The controllers/processor 580 and/or other processors and modules at the UE 120 may also perform or direct the execution of the functional blocks illustrated in FIGS. 7 and 10, and/or other processes for the techniques described herein. The memories 542 and 582 may store data and program codes for the eNB 110 and the UE 120, respectively. A scheduler 544 may schedule UEs for data transmission on the downlink and/or uplink.

Figure 6:
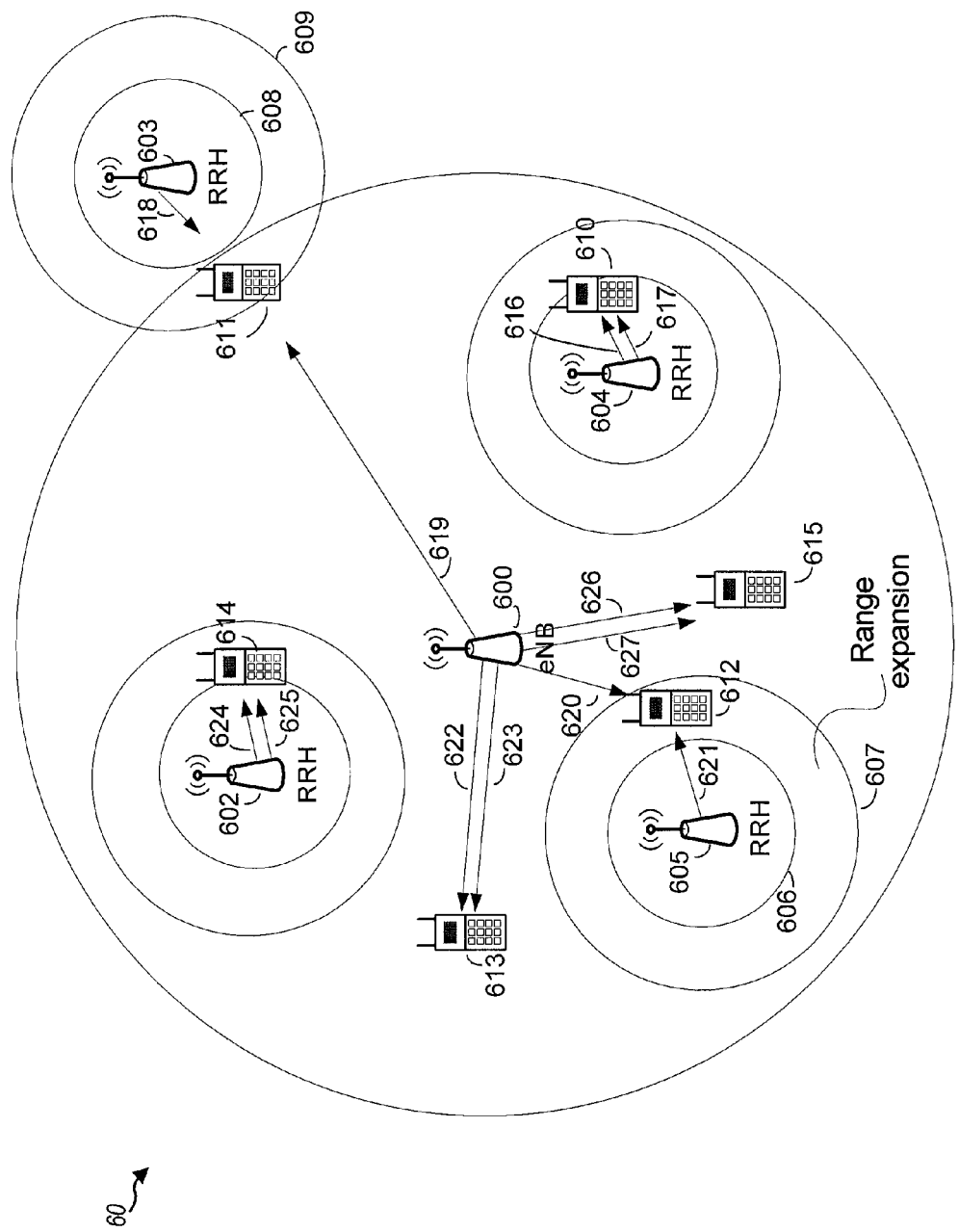
FIG. 6 is a diagram illustrating a heterogeneous network (HetNet) coordinated multipoint (CoMP) cell using low power radio resource heads (RRHs)

FIG. 6 is a diagram illustrating a heterogeneous network (HetNet) coordinated multipoint (CoMP) cell, cell 60, using low power radio resource heads (RRHs). Cell 60 is served by macro eNB 600. Within cell 60, multiple RRHs are deployed that provide the HetNet communication through the low power nodes, RRHs 602, 604, and 605, along with macro node 600. RRH 603 is located outside of cell 60, but its cell range expansion region overlaps into the coverage area of cell 60. UEs 610 and 614 are located within the coverage zones of RRHs 604 and 602, respectively. RRHs 604 and 602 serve UEs 610 and 614, respectively, under conventional LTE conditions, with data transmissions 616 and 624, and control transmissions 617 and 625 being served by RRHs 604 and 602, respectively. UEs 611 and 612 are within the cell range expansion zones of RRHs 603 and 605, respectively, and between the coverage zones 608 and 606, and the bandwidth edges 609 and 607, respectively. Even though RRH 603 lies outside of cell 60, UE 611 may still engage in communication with RRH 60 within its range expansion zone As illustrated, data transmission 618 is served by RRH 603 while control transmission 619 is decoupled being served by macro eNB 600. Similarly, UE 612 receives control transmission 620 from macro eNB 600 decoupled from the data transmission 621 from RRH 605. The UEs 613 and 615 are located only within the coverage zone of macro eNB 600. Therefore, the control transmissions 622 and 627, respectively, and data transmissions 623 and 626, respectively, are provided by macro eNB 600.

The configuration of the decoupled control transmissions 619 and 620 and data transmissions 618 and 621 to UEs 611 and 612, respectively, may allow macro eNB 600 to offload data transmission to UEs without interference cancelation capabilities. For example, UE 612 does not have interference capabilities. When analyzing the cell 60, UEs 611 and 612 may see macro eNB 600 as the strongest cell. Thus, if both control and data transmissions were served by RRHs 603 and 605, respectively, there may be too much interference in the control transmission for UEs 611 and 612 to accurately handle. Thus, by decoupling control transmissions 619 and 620 to macro eNB 600, an efficient control and data download process may be established with UEs 611 and 612, respectively.

While data and control transmissions may be decoupled between multiple base stations, each such base station continues to broadcast common reference signals (CRS). However, because the data, through the PDSCH, may come from an RRH in a different location than the macro eNB, from which control signals originate, there may be a timing mismatch between the signals received from the macro eNB transmitting the control signals and the signals received from the RRH handling the decoupled data transmissions. This timing mismatch may cause the UE to incorrectly demodulate incoming data as the UE will attempt to use the CRS timing associated with the control signals to demodulate data received from a different network entity. Moreover, the network may dynamically switch between eNBs, RRHs, or other such base stations for handling decoupled transmissions on a subframe-by-subframe basis. This switching takes place transparently with respect to the UE. The network does not signal the UE what entity is transmitting data to it.

One aspect of the present disclosure uses the UE reference signal (UERS) transmitted with the PDSCH to estimate the timing error. The UERS is a UE-specific RS for PDSCH demodulation, which is transmitted with the PDSCH. The UERS timing estimation is based on a per-subframe UERS transmission. UERS are not combined from multiple subframes, as the originating network entity may switch from subframe-to-subframe. The UERS-based timing estimation will, however, combine all of the PDSCH RBs allocated for UERS. In non-CoMP systems, a UE may calculate timing error estimates in downlink transmissions using the CRS. In fact, timing error estimates calculated using the CRS are typically more accurate. However, as noted, the UE does not know which network entity (e.g., eNB, RRH, pico eNB, femto eNB, and the like) is transmitting the data and which is transmitting the control signals. Thus, without knowledge of the specific network entity that the CRS is received from, the UE would not be able to determine which CRS to use to accurately calculate the timing error estimates. Thus, the aspects of the present disclosure use the UERS signals for estimating timing errors.

Each UERS-based RB has a certain number UERS signals available depending on the rank or multiple in, multiple out (MIMO) states. For example, in rank 1 or 2, there are 12 available UERS signals, while in rank 3 or 4, there are 24 available UERS signals. The UERS signals used to perform the timing error estimation have already been de-spread. After de-spreading, the UERS signals are essentially equivalent to channel coefficients on the UERS tones plus the added white Gaussian noise (AWGN) on the UERS tones. Assuming that a channel is coherent between two adjacent UERS tones, a channel on one UERS tone may be roughly modeled in the frequency domain as the channel on an adjacent UERS tone multiplied by a phase ramping term. This phase ramping, in the frequency domain, is essentially equivalent to the timing error in the time domain. In calculating the time error estimate, this frequency-domain-based model is applied to all UERS tones over all assigned UERS-based PDSCH RBs.

Once modeled accordingly, an estimator is applied to the resulting modeled UERS tones to estimate the phase ramping term. For example, a maximum ratio combining (MRC) estimator may be applied to the modeled UERS tones to estimate the phase ramping term. In additional aspects of the present disclosure, other types of estimators may be applied, including minimum mean square error (MMSE) estimators, simple averaging estimators, and the like. The resulting frequency domain phase ramping term estimate may then be mapped back to the time domain to determine the timing error estimate. The mapping may be implemented using any number of different mapping techniques, including an arctangent function or the like.

Figure 7:
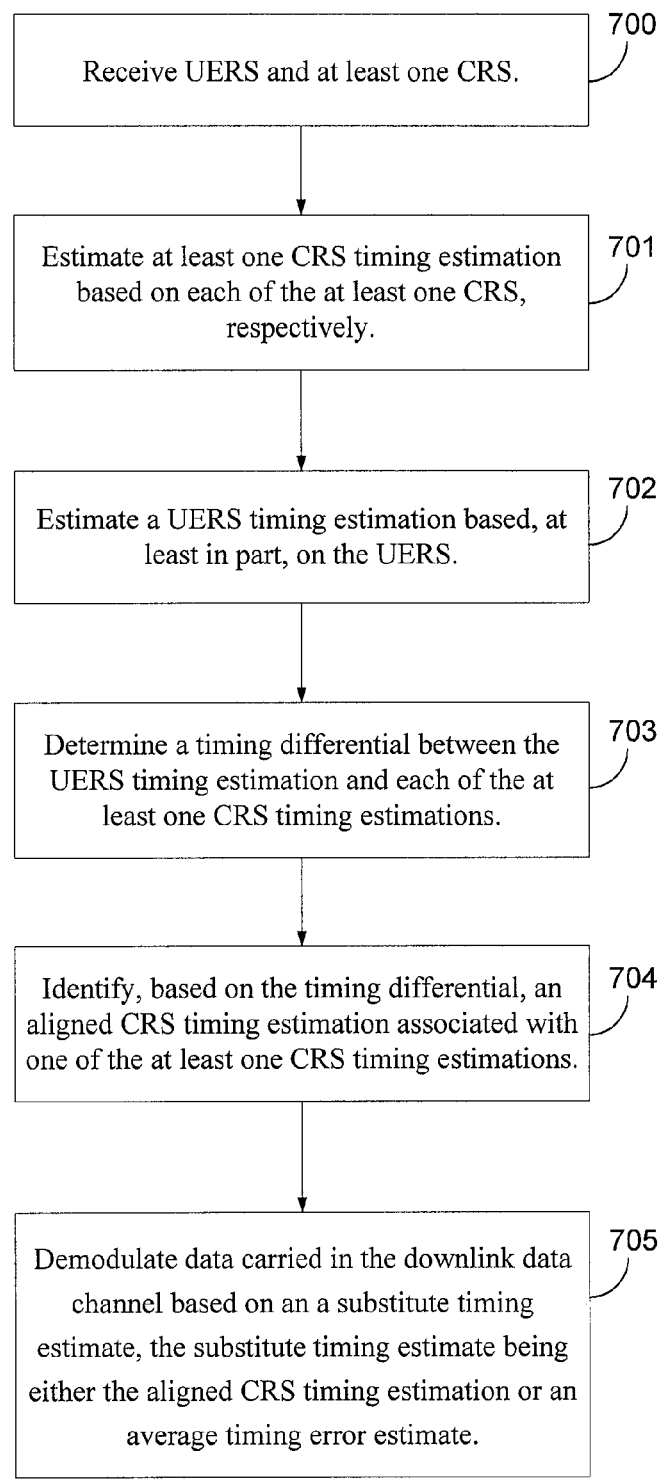
FIG. 7 is a functional block diagram illustrating example blocks executed to implement one aspect of the present disclosure.

FIG. 7 is a functional block diagram illustrating example blocks executed to implement one aspect of the present disclosure. In addition to estimating the timing error for demodulation using the UERS signals, the UERS-based timing error estimate may also be used to generate a more accurate timing error estimate with the help of available CRS signals. Thus, in block 700, a UE receives UERS and at least one CRS.

A CRS timing estimation is estimated, in block 701, based on each of the received CRS. A UE may be in a location that receives a number of CRS signals broadcast from a variety of base stations. Some of the CRS signals may share cell IDs as being broadcast by base stations, macro eNBs, RRHs, femto eNBs, pico eNBs, and the like within the same cell, while other of the CRS signals may originate from base stations from different cells.

In block 702, a UERS timing estimation is made based, at least in part, on the UERS signals received. As noted above, the UERS timing estimation may be estimated through modeling all of the channels in the UERS tones over all assigned UERS-based PDSCH RBs, applying an estimator to the modeled channels to produce a frequency domain error, and then mapping the frequency domain error into the UERS timing estimation.

The UE compares the UERS timing estimation with each of the CRS timing estimations, in block 703, to determine a timing differential. The UERS signal on which the UERS timing estimation is based is generally aligned with one of the CRS signals received at the UE.

In block 704, the UE identifies an aligned CRS timing estimation associated with one of the CRS timing estimations made, where the UE identifies the alignment based on the timing differential. As the UE compares the UERS timing estimation with each of the generated CRS timing estimations, in general, the pairing that creates the lowest timing differential will reveal the CRS signal and associated CRS timing estimation that the UERS timing estimation is aligned.

The UE demodulates data carried in the downlink data channel, in block 705. The demodulation is based on a substitute timing estimate that may be either the aligned CRS timing estimation or an average timing error estimate based on a combination of the aligned CRS estimation and the UERS timing estimation. As previously noted, timing error estimates based on CRS are generally more accurate than UERS-based timing error estimates. Accordingly, the UE may improve demodulation by substituting the CRS timing estimation for the UERS timing estimation. Alternatively, the UE may calculate an even more accurate timing error estimate by taking an average error estimate based on a combination of both the CRS timing estimation and the UERS timing estimation.

FIG. 8A is a block diagram illustrating a UE 801 configured according to one aspect of the present disclosure. UE 801 receives data transmission 804 and control transmission 805 from base station 800. This configuration represents a typical LTE Advanced connection without CoMP implementation. In this configuration, UE 801 may simply replace the UERS-based timing error estimate with a CRS-based timing error estimate because both signals originate from base station 800. However, instead of simply replacing the estimated timing error, a new weighted estimate is generated. UE 801 performs a weighted combining of the UERS-based timing error estimate and the CRS-based timing error estimate to generated the new weighted estimate. Because the CRS-based timing error estimate is generally more accurate, it is given more weight than the UERS-based timing error estimate in the weighted combining.

FIG. 8B is a block diagram illustrating UE 801 configured according to an aspect of the present disclosure. UE 801 is located in a CoMP system with dynamic point selection. In a dynamic point selection configuration, data transmissions may be provided by whichever base station, such as base stations 800 and 802, would have the more beneficial signal path to the served UE, such as UE 801. Thus, data transmissions may switch from originating in base station 802, data transmission 807a, in a first subframe, to originating in base station 800, data transmission 807b, in the next subframe, and so forth, switching whenever the conditions are beneficial for the switch. UE 801 is oblivious to the switching, instead only simply receiving the data transmissions 807a and 807b. Base station 800 and base station 802 reside in different cells and, therefore, have different cell IDs. For example, referring back to FIG. 6, base station 800 may be macro eNB 600 in cell 60, while base station 802 may be RRH 603 outside of cell 60. Because base stations 800 and 802 are located in two different cells, there will be two different CRS that can provide two timing error estimations, one for each cell. However, there will only be one UERS-based timing error estimate for each subframe.

In subframe 1, the PDSCH is transmitted in data transmission 807a from base station 802. Thus, in subframe 1, the CRS and UERS-based timing error estimates from base station 802 should be more closely matched than the UERS-based timing error estimate from base station 802 and the CRS-based timing error estimate from base station 800. In subframe 2, the PDSCH is transmitted in data transmission 807b from base station 800. Thus, similarly, the CRS and UERS-based timing error estimates from base station 800 should be more closely matched than with the CRS from base station 802. UE 801 includes logic that compares the timing differentials of the UERS-based timing error estimate and each of the CRS-based estimates to determine which of the base stations transmitted the PDSCH. Once this determination is made, the UE 801 may simply replace the UERS-based timing error estimate with the CRS-based timing error estimate of the CRS broadcasted from the identified base station, e.g., the CRS from base station 802 during subframe 1 with data transmission 807a, or the CRS from base station 800 during subframe 2 with data transmission 807b. Alternatively, UE 801 generates the new weighted estimated based on a weighted combining of the UERS-based timing error estimate and the CRS-based timing error estimate from the CRS broadcasted from the identified base station.

FIG. 8C is a block diagram illustrating UE 801 configured according to one aspect of the present disclosure. UE 801 is located in a CoMP system with dynamic point selection. The example illustrated represents a single instant subframe, in which base station 800 provides control transmission 806 and base station 803 provides data transmission 809 and control transmission 810. The control signals, thus, arrive in a compound channel. Base stations 800 and 803 also are in the same cell each having the same cell ID. As such, the CRS can only provide one timing error estimate. However, while base stations 800 and 803 each have the same cell ID, the CRS signals may be slightly mismatched because of their different geographic locations. Therefore, the CRS signal corresponding to the first arrival path of the compound channel will be selected for providing the correct timing error estimate. This CRS-based timing error estimate, then, becomes the bound for the UERS-based timing error estimation.

For example, if the UERS-based timing error estimate is either synchronous or earlier than the CRS-based error estimate, the UE will replace the UERS-based timing error estimate with the CRS-based error estimate, as that relationship would suggest that this CRS, the PDSCH, and UERS are transmitted from the same base station, base station 803. In contrast, if the UERS-based timing error estimate is later than the CRS-based error estimate from the CRS of the first arrival path, then the UE 801 will use the UERS-based timing error.

FIG. 8D is a block diagram illustrating UE 801 configured according to one aspect of the present disclosure. As illustrated, UE 801 is located in a CoMP system with dynamic point selection in which, at the instant subframe shown, base station 800 provides control transmission 811 and data transmission 812 and base station 803 provides control transmission 813 and data transmission 814. Each of base stations 800 and 803 participates in joint control transmissions 811 and 813 and data transmissions 812 and 814. Here again, each of base stations 800 and 803 shares the same cell ID and therefore, the CRS. Also, each of base stations 800 and 803 are jointly transmitting the control and data signals. Accordingly, as illustrated in FIG. 8A, UE 801 may either replace the UERS-based timing error estimate with a CRS-based timing error estimate or generate a new weighted estimate based on a weighted combining of the UERS-based timing error estimate and the CRS-based timing error estimate.

Figure 9:
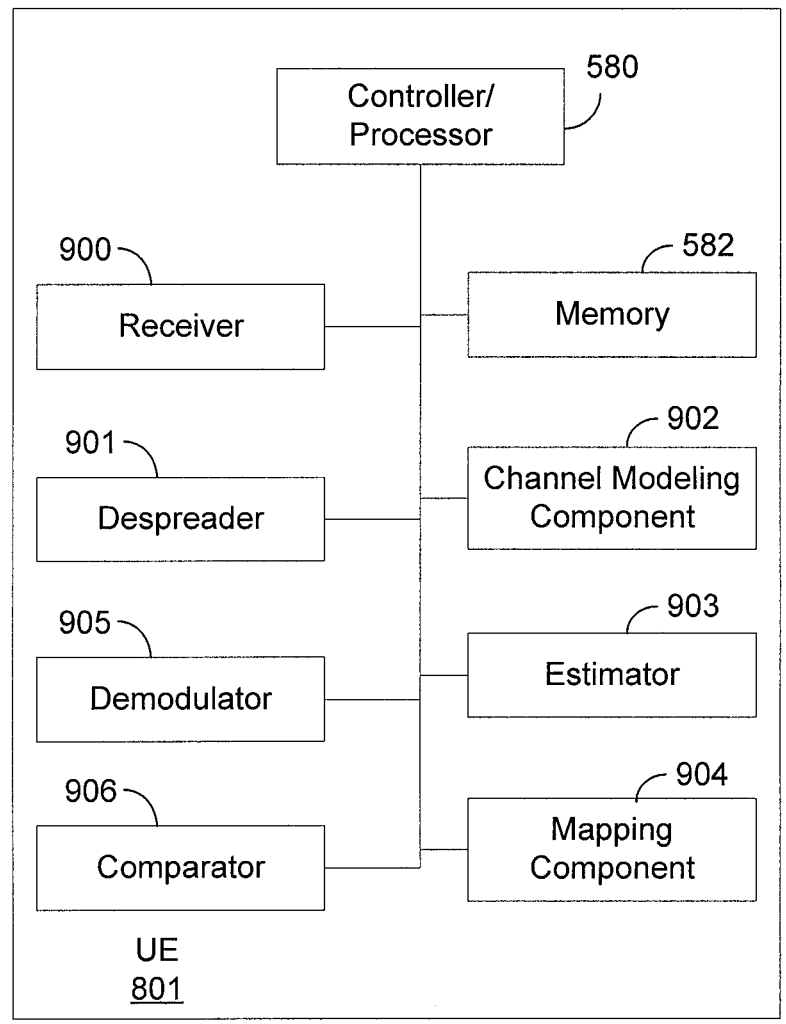
FIG. 9 is a block diagram conceptually illustrating a detailed view of a UE configured according to one aspect of the present disclosure.

FIG. 9 is a block diagram conceptually illustrating a detailed view of a UE 801 configured according to one aspect of the present disclosure. UE 801 includes a controller/processor 580. Controller/processor 580 controls the hardware components and executes the computer program code instructions that provide the features and functionality of UE 801. A memory 582, coupled to and accessible by controller/processor 580, stores program code instructions for various components, modules, functions, and features, and also stores information, signals, and/or data that may be received or maintained by UE 801.

In operation, UE 801 receives downlink data signals and CRS signals through receiver 900, under control of controller/processor 580. With reference to FIG. 5, receiver 900 may include such hardware and functional components as antennas 552a-r, MIMO detector 556, and receive processor 558, as well as demodulator 905, which may include modulators 554a-r. The received downlink data signals include UERS signals associated with each UERS-based RB. Thus, the combination of these components provides means for receiving UERS and CRS.

UE 801 generates a CRS-based timing error estimate for each of the CRS signals it receives. Controller/processor 580 executes estimation code stored in memory 582 to operate estimator 903 to provide a timing error estimate based on the received CRS signals. The combination of these components provides means for estimating at least one CRS timing estimation based on each of the received CRS signals.

It should be noted that the program code in memory 582 executed by controller/processor 580 to generate estimator 903 may provide various different estimating schemes. Additionally, controller/processor 580 may execute different estimating schemes for application during different parts of the timing error estimation and demodulation processes.

UE 801 also generates a UERS-based timing error estimate. Under control of the controller/processor 580, despreader 901 prepares the received UERS channels for processing. Controller/processor 580 executes program code in memory 582 to operate channel modeling component 902. Channel modeling component 902 models each channel on the UERS tones over all of the UERS-based downlink data channel RBs as a channel on an adjacent UERS tone multiplied by a phase ramping term. Controller/processor 580 then executes program code to operate estimator 903 on the modeled UERS channels. The resulting estimate from estimator 903 is the phase ramping term associated with the modeled UERS channels. Controller/processor 580 executes program code in memory 582 to operate mapping component 904. Mapping component 904 operates to map the frequency domain value of the phase ramping term estimates into the time domain equivalent of the timing error estimates. The combination of these components provides means for estimating a UERS timing estimation based, at least in part, on the UERS.

After generating the UERS timing estimation and each of the CRS timing estimations, controller/processor 580 calculates a timing differential between the UERS timing estimation and each of the CRS timing estimations, respectively. The timing differentials may be temporarily stored in memory 582 for further processing. The combination of these components provides means for determining a timing differential between the UERS timing estimation and each of the at least one CRS timing estimations Controller/processor 580 controls comparator 906 to compare each of the time differentials determined between the UERS timing estimation and each of the CRS timing estimation, respectively. Comparator 906 will identify which of the timing differentials is the least, thus, suggesting alignment between the UERS signal, on which the UERS timing estimation is based, and the particular CRS signal, on which the identified CRS timing estimation associated with the lowest timing differential, is based. The combination of these components provide means for identifying, based on the timing differential, an aligned CRS timing estimation associated with one of the at least one CRS timing estimations.

Controller/processor 580 operates demodulator 905 to demodulate data from the downlink data channels received in the downlink data signals. In certain aspects of the present disclosure, the controller/processor 580 provides the aligned CRS timing estimate to demodulator 905 in order to demodulate the data signals. In additional aspects of the present disclosure, the controller/processor 580 provides demodulator 905 an average timing error based on a combination of the aligned CRS timing estimation and the UERS timing estimation. The combination of these components provides means for demodulating data carried in the downlink data channel based on an a substitute timing estimate, the substitute timing estimate being either the aligned CRS timing estimation or an average timing error estimate, wherein the average timing error estimate is based on a combination of the aligned CRS timing estimation and the UERS timing estimation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 7 and 10 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, by a user equipment (UE), user equipment reference signal (UERS);
   receiving, by the UE, at least one common reference signal (CRS);
   estimating, by the UE, at least one CRS timing estimation based on each of the at least one CRS, respectively;
   estimating, by the UE, a UERS timing estimation based, at least in part, on the UERS;
   determining, by the UE, a timing differential between the UERS timing estimation and each of the at least one CRS timing estimations;
   identifying, by the UE, based on the timing differential, an aligned CRS timing estimation associated with one of the at least one CRS timing estimations; and
   demodulating, by the UE, data carried in the downlink data channel based on an a substitute timing estimate, the substitute timing estimate being one of:
   the aligned CRS timing estimation; or
   an average timing error estimate, wherein the average timing error estimate is based on a combination of the aligned CRS timing estimation and the UERS timing estimation.

2. The method of claim 1, wherein estimating the UERS timing estimation comprises:
   generating a frequency domain modeled channel for each channel on a plurality of UERS tones over a plurality of UERS-based downlink data channel resource blocks (RBs);
   generating phase ramping term by applying an estimator to each of the frequency domain modeled channels; and
   mapping the estimated phase ramping term to the UERS timing estimate.

3. The method of claim 2, wherein the frequency domain modeled channels comprising an adjacent channel on an adjacent UERS tone of the plurality of UERS tones multiplied by the phase ramping term.

4. The method of claim 1, wherein receiving the at least one CRS comprises receiving a serving CRS and a non-serving CRS;
   wherein estimating the at least one CRS timing estimation includes estimating a serving-CRS timing estimation and non-serving CRS timing estimation; and
   wherein the aligned CRS timing estimation is the CRS timing estimation associated with a lowest of the timing differentials.

5. The method of claim 1, wherein receiving the CRS, comprises receiving the at least one CRS from a plurality of transmission points.

6. The method of claim 5, wherein the UERS timing estimation is earlier or synchronous with one or more of the at least one CRS timing estimations.

7. The method of claim 1, wherein the average timing error estimate comprises one of:
   a weighted combining of the aligned CRS timing estimation and the UERS timing estimate; and
   an average of the aligned CRS timing estimation and the UERS timing estimate.

8. An apparatus configured for wireless communication, comprising:
   means for receiving user equipment reference signal (UERS);
   means for receiving at least one common reference signal (CRS);
   means for estimating at least one CRS timing estimation based on each of the at least one CRS, respectively,
   means for estimating a UERS timing estimation based, at least in part, on the UERS;
   means for determining a timing differential between the UERS timing estimation and each of the at least one CRS timing estimations;
   means for identifying, based on the timing differential, an aligned CRS timing estimation associated with one of the at least one CRS timing estimations; and
   means for demodulating data carried in the downlink data channel based on an a substitute timing estimate, the substitute timing estimate being one of:
   the aligned CRS timing estimation; or
   an average timing error estimate, wherein the average timing error estimate is based on a combination of the aligned CRS timing estimation and the UERS timing estimation.

9. The apparatus of claim 8, wherein means for estimating the UERS timing estimation comprises:
   means for generating a frequency domain modeled channel for each channel on a plurality of UERS tones over a plurality of UERS-based downlink data channel resource blocks (RBs);
   means for generating phase ramping term by applying an estimator to each of the frequency domain modeled channels; and
   means for mapping the estimated phase ramping term to the UERS timing estimate.

10. The apparatus of claim 9, wherein the frequency domain modeled channels comprising an adjacent channel on an adjacent UERS tone of the plurality of UERS tones multiplied by the phase ramping term.

11. The apparatus of claim 8, wherein means for receiving the at least one CRS comprises means for receiving a serving CRS and a non-serving CRS;
    wherein means for estimating the at least one CRS timing estimation includes means for estimating a serving-CRS timing estimation and non-serving CRS timing estimation; and wherein the aligned CRS timing estimation is the CRS timing estimation associated with a lowest of the timing differentials.

12. The apparatus of claim 8, wherein means for receiving the CRS, comprises means for receiving the at least one CRS from a plurality of transmission points.

13. The apparatus of claim 12, wherein the UERS timing estimation is earlier or synchronous with one or more of the at least one CRS timing estimations.

14. The apparatus of claim 8, wherein the average timing error estimate comprises one of:
a weighted combining of the aligned CRS timing estimation and the UERS timing estimate; and
an average of the aligned CRS timing estimation and the UERS timing estimate.

15. A computer program product for wireless communications in a wireless network, comprising:
a non-transitory computer-readable medium having program code recorded thereon, the program code comprising:
program code to receive user equipment reference signal (UERS);
program code to receive at least one common reference signal (CRS);
program code to estimate at least one CRS timing estimation based on each of the at least one CRS, respectively,
program code to estimate a UERS timing estimation based, at least in part, on the UERS;
program code to determine a timing differential between the UERS timing estimation and each of the at least one CRS timing estimations;
program code to identify, based on the timing differential, an aligned CRS timing estimation associated with one of the at least one CRS timing estimations; and
program code to demodulate data carried in the downlink data channel based on an a substitute timing estimate, the substitute timing estimate being one of:
the aligned CRS timing estimation; or
an average timing error estimate, wherein the average timing error estimate is based on a combination of the aligned CRS timing estimation and the UERS timing estimation.

16. The computer program product of claim 15, wherein the program code to estimate the UERS timing estimation comprises:
program code to generate a frequency domain modeled channel for each channel on a plurality of UERS tones over a plurality of UERS-based downlink data channel resource blocks (RBs);
program code to generate phase ramping term by applying an estimator to each of the frequency domain modeled channels; and
program code to map the estimated phase ramping term to the UERS timing estimate.

17. The computer program product of claim 16, wherein the frequency domain modeled channels comprising an adjacent channel on an adjacent UERS tone of the plurality of UERS tones multiplied by the phase ramping term.

18. The computer program product of claim 15, wherein the program code to receive the at least one CRS comprises program code to receive a serving CRS and a non-serving CRS;

wherein the program code to estimate the at least one CRS timing estimation includes program code to estimate a serving-CRS timing estimation and non-serving CRS timing estimation; and
wherein the aligned CRS timing estimation is the CRS timing estimation associated with a lowest of the timing differentials.

19. The computer program product of claim 15, wherein the program code to receive the CRS, comprises program code to receive the at least one CRS from a plurality of transmission points.

20. The computer program product of claim 19, wherein the UERS timing estimation is earlier or synchronous with one or more of the at least one CRS timing estimations.

21. The computer program product of claim 15, wherein the average timing error estimate comprises one of:
a weighted combining of the aligned CRS timing estimation and the UERS timing estimate; and
an average of the aligned CRS timing estimation and the UERS timing estimate.

22. An apparatus configured for wireless communication, the apparatus comprising
at least one processor; and
a memory coupled to the at least one processor,
wherein the at least one processor is configured:
to receive user equipment reference signal (UERS);
to receive at least one common reference signal (CRS);
to estimate at least one CRS timing estimation based on each of the at least one CRS, respectively,
to estimate a UERS timing estimation based, at least in part, on the UERS;
to determine a timing differential between the UERS timing estimation and each of the at least one CRS timing estimations;
to identify, based on the timing differential, an aligned CRS timing estimation associated with one of the at least one CRS timing estimations; and
to demodulate data carried in the downlink data channel based on an a substitute timing estimate, the substitute timing estimate being one of:
the aligned CRS timing estimation; or
an average timing error estimate, wherein the average timing error estimate is based on a combination of the aligned CRS timing estimation and the UERS timing estimation.

23. The apparatus of claim 22, wherein the configuration of the at least one processor to estimate the UERS timing estimation comprises configuration of the at least one processor:
to generate a frequency domain modeled channel for each channel on a plurality of UERS tones over a plurality of UERS-based downlink data channel resource blocks (RBs);
to generate phase ramping term by applying an estimator to each of the frequency domain modeled channels; and
to map the estimated phase ramping term to the UERS timing estimate.

24. The apparatus of claim 23, wherein the frequency domain modeled channels comprising an adjacent channel on an adjacent UERS tone of the plurality of UERS tones multiplied by the phase ramping term.

25. The apparatus of claim 22, wherein the configuration of the at least one processor to receive the at least one CRS comprises configuration of the at least one processor to receive a serving CRS and a non-serving CRS;
wherein the configuration of the at least one processor to estimate the at least one CRS timing estimation includes configuration of the at least one processor to estimate a serving CRS timing estimation and non-serving CRS timing estimation; and wherein the aligned CRS timing estimation is the CRS timing estimation associated with a lowest of the timing differentials.

26. The apparatus of claim 22, wherein the configuration of the at least one processor to receive the CRS, comprises configuration of the at least one processor to receive the at least one CRS from a plurality of transmission points.

27. The apparatus of claim 26, wherein the UERS timing estimation is earlier or synchronous with one or more of the at least one CRS timing estimations.

28. The apparatus of claim 22, wherein the average timing error estimate comprises one of:

a weighted combining of the aligned CRS timing estimation and the UERS timing estimate; and an average of the aligned CRS timing estimation and the UERS timing estimate.

* * * * *